No. 697,912. Patented Apr. 15, 1902.
A. J. CHASE.
APPARATUS FOR DISTILLING WATER.
(Application filed June 25, 1901.)
(No Model.) 2 Sheets—Sheet 1.
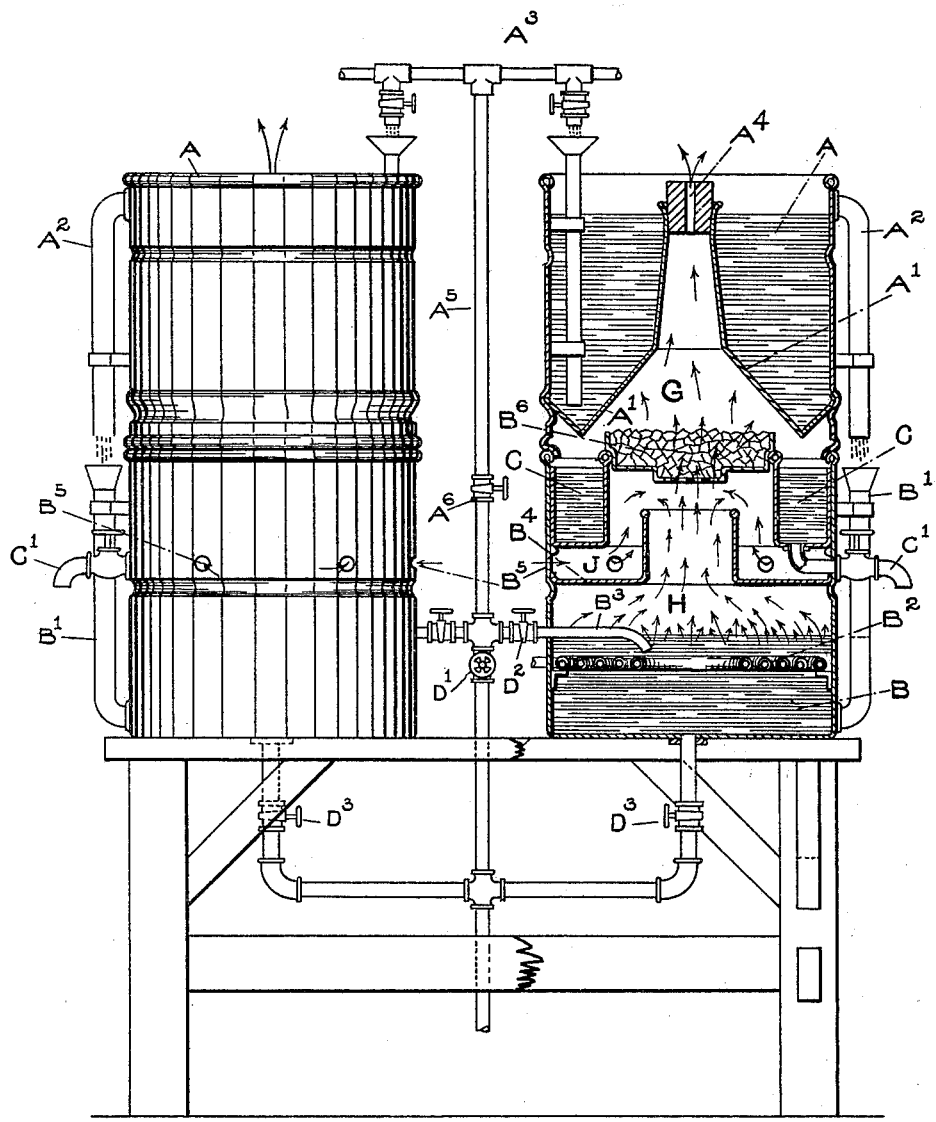
Fig-1-
WITNESSES; INVENTOR;
Charles R. Ellis Andrew J. Chase
Walter D. Hoyt BY Charles Carr
Atty

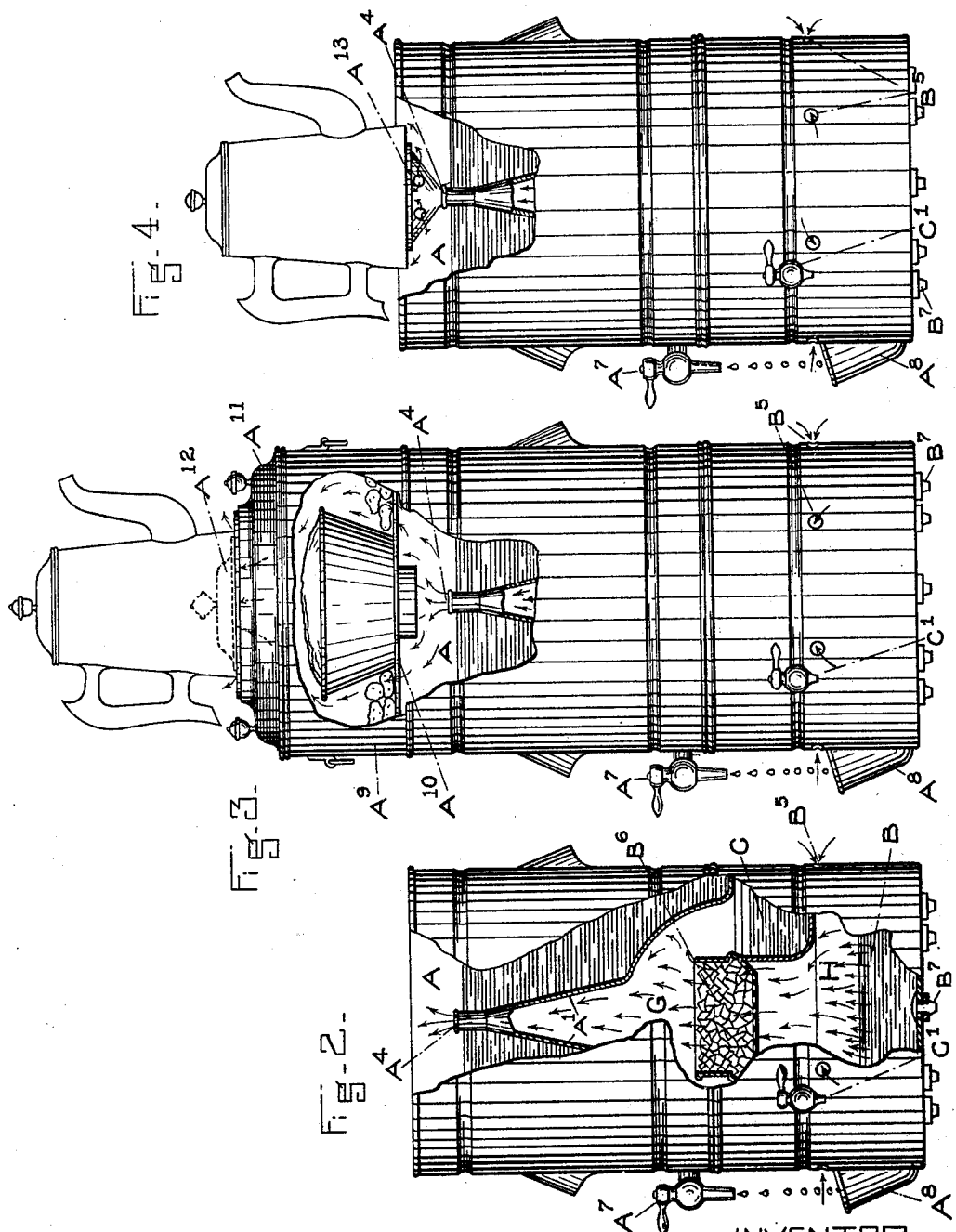

UNITED STATES PATENT OFFICE.

ANDREW J. CHASE, OF BOSTON, MASSACHUSETTS.

APPARATUS FOR DISTILLING WATER.

SPECIFICATION forming part of Letters Patent No. 697,912, dated April 15, 1902.

Application filed June 25, 1901. Serial No. 66,031. (No model.)

*To all whom it may concern:*

Be it known that I, ANDREW J. CHASE, a citizen of the United States, residing at Boston, in the county of Suffolk and State of Massachusetts, have invented certain new and useful Improvements in Apparatus for Distilling Water, of which the following is a specification.

This my present invention is the result of many years' study of the subject and of many experiments; and it consists of improvements upon former patents issued to me in whole and in part—namely, No. 530,015, dated November 27, 1894, and No. 558,775, dated April 21, 1896.

The object of this invention is to provide an apparatus the product of which will be pure aerated distilled water, even when the source of water-supply is more or less impure, as obtained from springs, pond, river, or sea.

The invention consists of an air-sterilizing and a water-distilling apparatus in which the air and the aqueous vapor are mutually combined, and consists in proper relation of a water-evaporating boiler, the vapors of which are exposed to the action of sterilized air admitted through apertures in the vessel and located above the vaporizing-chamber, a filter directly above the vaporizing-chamber, a condensing-chamber above the filter for the condensation of the sterilized, filtered, and aerated aqueous vapor which has passed through the filtering material, a reservoir for receiving the condensation, and a cold-water tank, the conical bottom of which encompasses the condensing-chamber, the said tank having a source of cold-water supply and an arrangement of piping, whereby the overflow is conducted to the boiler below.

Referring to the accompanying drawings, Figure 1 represents a small plant consisting of a pair of stills coupled together in such a manner that one or both may be in operation at the same time, the evaporation of the water in this case being accomplished with steam heat. The right-hand still is shown in central vertical section and illustrates the arrangement and relation of the various parts. Fig. 2 is an elevation, partly sectional, of a single still adapted more particularly for family use, the heat for vaporizing being applied externally. Fig. 3 is a still similar to that shown in Fig. 2, with an additional cooking device detachably connected to its upper part. Fig. 4 illustrates the application of a funnel-shaped device for supporting a cooking utensil when it is placed over the escape-vent of a still.

Similar reference-letters on all of the drawings refer to similar parts.

In operation the process of obtaining the pure sterilized aerated distilled water is the same in all the stills illustrated in this specification, the construction only being modified to suit different conditions.

It must be evident to all who have had experience that what has been considered distilled water in the past—namely, condensed steam—is neither pure nor palatable. In fact, when obtained under any steam-pressure it is impure and insipid to a nauseating degree.

The stills are preferably of circular form, and, as shown in Fig. 1, are constructed with an upper and lower tank, the upper adapted to seat upon the lower and to be readily removable therefrom. The upper tank (indicated by letter A) is kept filled with cold water, a conical flue A', which is substantially encompassed by the condensing-chamber, forming its bottom. The flue, rising through and above the water in tank A, is open at the top $A^4$, providing an escape-vent for the more volatile gases ascending from the vaporizing-chamber below. This conical flue A', which, as before stated, serves as the bottom of tank A, provides a large condensing-surface, and the condensed vapors readily flow or drip from its inclined surface to the aerated distilled-water reservoir C below. The water for filling tank A may be taken from any source of supply, in this case through service-pipe $A^3$, the point of delivery being at the bottom of the tank where most needed for condensing the vapor beneath in the condensing-chamber G. The water in tank A while serving for condensing the vapor in chamber G becomes warm and naturally rising finds its overflow into the evaporating-boiler B through pipes $A^2$ and B'. An overflow-pipe $B^3$ in the boiler B keeps the water at a constant level, the downwardly-bent end of this pipe forming a trap to prevent any escape of the vapor. The pipe B' which supplies the boiler with water enters sufficiently low into the boiler B to prevent all escape of vapor. Just below the surface of the water in boiler B is a horizontal steam-coil B², properly connected to an external source of supply for the purpose of converting the water into vapor. As the object of this whole device is to obtain a pure water, it is important that every means be employed to attain this end. For this reason the steam-coil B² and the water-inlet pipe in the boiler B are arranged as follows: The horizontal steam-coil B² is located just below the overflow-pipe B³, near the surface of the water, and the inlet-pipe B' delivers its water close to the bottom of the boiler. The advantage of this arrangement is twofold: First, the steam-coil, located at or near the surface, a comparatively small quantity of water is in a state of ebullition. The pipes B' and A², feeding the water to the boiler, receive their supply from tank A, which in turn receives its supply from the surface-pipe A³, this supply being controlled by hand or by the common method of stop valve and float, (not shown here,) keeping pace with the vaporization. Second, owing to the supply being admitted at the bottom of the tank the water below the coil is in a comparatively cool and quiet state, during which time the salts, minerals, and other impurities are precipitated to the bottom of the boiler, the purer surface-water, as before stated, being all that is boiling or being vaporized. Another advantage may be mentioned. Owing to the elevated position of the coil B² the bottom of the boiler may be readily cleansed by hand in addition to flushing, the opening in the center of the coil being of sufficient size to pass the hand through. In the vaporizing-chamber directly above and parallel to the surface of the water in the boiler B is a partition B⁴, having in its center a cylindrical neck, through which as it ascends the aqueous vapor passes. An annular space J, formed by the riser of partition B⁴ and the shell of the boiler, is thus formed in and is open to the vaporizing-chamber H. This annular space J is supplied with an influx of free external air, admitted through the orifices B⁵ in the shell of the boiler, the air becoming exceedingly hot or sterilized while on its passage to the filter B⁶. In its relation to the other parts of this apparatus and to the final condition of the water which is produced the filter is most important.

The thorough aeration with sterilized air of distilled water, which has lost its air through evaporation, is best accomplished at the moment when the gases of evaporation are most volatile—that is, while ascending from the vaporizing and sterilizing chambers the sterilized air circulating through the annular space J is brought in direct contact with the ascending vapors. This commingling of the aqueous vapor and sterilized air, all of which is compelled to pass through the large and centrally-located filter and its filtering material previous to its arrival in the condensing-chamber, insures a thoroughly-aerated water when it is condensed. This filter is located centrally within the still. The location of this filter, as shown, has the advantage of a large area very necessary to the perfect operation of this particular kind of still. Unlike other apparatus for distilling water, this, my latest still, condenses an aqueous vapor previously mixed with sterilized air after it has passed through a filtering material. The condensing-chamber, of conical form, converts to water the vapor ascending through and from the filter, the annular reservoir C, the inner shell of which supports the filter, catching the water as it flows or drips from the inclined surface A' of the condensing-chamber.

The pure water in reservoir C, which is the product of this invention thoroughly aerated and regenerated, may be drawn off ready for use through the faucet C'.

The upward flow of the hot vapors (indicated by the arrows) has a tendency to keep a supply of external air rushing into the annular space J through the orifices B⁵, being sterilized in its passage.

The cold-water tank A, Fig. 1, is preferably constantly supplied with cold water in just sufficient quantity to maintain the water-levels shown in tanks A and B, the supply from service-pipe A³ being regulated, as previously described, by the amount of evaporation.

The ammoniacal and other foreign gases contained in the water-supplied tank A have a tendency to pass off before its delivery to boiler B.

The arrangement of the piping shown in Fig. 1 affords an excellent means of cleansing the tank and boiler. The evaporating-boiler may be flushed by closing the valve D' of pipe A⁵ and opening valve A⁶ above on same pipe. Valves D² of overflow and D³ of waste pipes also being open will permit the flushing of the boiler with water from service-pipe A⁵.

The positions of the valves when water is being vaporized are as follows: Waste-pipe valve D³ is closed, overflow-pipe D² and valve D' are open, and valve A⁶ of supply-pipe is closed.

The tank A may be flushed by a rapid flow of water from the service-pipe A³.

A family still adapted for use on an ordinary cook-stove or other form of heater is illustrated in Fig. 2. In this still a faucet A⁷, for drawing off the contents of the tank A, is shown at the left, below which the cup A⁸ for receiving this water communicates with the boiler B. Metal studs B⁷ are introduced into the bottom of the boiler B for the more rapid heating of the water, the studs B⁷ being a better conductor of heat than the plane surface through which they pass and to which they are secured.

The filtering material $B^6$, located above the vaporizing-chamber, retards the upward flow of the aqueous vapors, which during its passage through to the condensing-chamber G becomes charged with the sterilized air admitted at $B^5$, being finally condensed in chamber G, flowing or dripping into reservoir C, from which it may be drawn by the faucet $C'$.

A cooking apparatus to be used in conjunction with this still is illustrated in Fig. 3, which in no way interferes with nor changes the operation of the still. This cooking apparatus consists of a vessel $A^9$, similar in section to the still and adapted to rest upon the same, being readily removable. The vessel is provided with a removable cover $A^{11}$, as large in diameter as the vessel itself, and in this large cover is a smaller removable cover $A^{12}$. The vessel $A^9$, which I will call a "cooker," when placed upon the still utilizes the hot vapors or gases which escape from the vent $A^4$ of the conical flue $A'$, the perforated shelf $A^{10}$ permitting the free passage of these vapors to all parts of the cooker. The smaller cover may be removed for heating any small cooking utensil. Another arrangement for use with cooking utensils is shown in Fig. 4. A tunnel-shaped device $A^{13}$, designed to fit over the vent $A^4$ of the flue $A'$, is open at top and bottom and perforated at the sides, so that the heat may be diffused over as large a surface as possible, providing a quick and ready means of heating various articles.

I claim—

1. In a water-still having an evaporating-boiler and a condenser; in combination therewith, a centrally-located filter vertically placed between the evaporator and condenser and so arranged that all ascending vapor and air passes through the said filter; substantially as shown and described.

2. In a water-still having an evaporating-boiler and a condenser, in combination therewith, a filter concentrically located above the sterilizing-chamber, manifold air-holes permitting air to commingle with the vapor below the said filter, said filter so arranged that the air and vapor is forced to pass through it, in its ascent before it can reach the condensing-chamber and the escape-vent of the still, and a water-reservoir surrounding said filter, arranged substantially as shown and described.

3. In a water-still having an evaporating-boiler and a condenser; in combination therewith a manifold of influx air-holes into the sterilizing-chamber below the filter, a filter and a reservoir occupying the whole area within the still compelling the commingling of the vapor and air before passing through said filter to be condensed, a condensing-surface above said filter and a reservoir for receiving the condensed vapor; substantially as shown and described.

4. In a water-still having an evaporating-boiler and a condenser; in combination therewith a filter provided with fitering material located within the still proper and so arranged that through said filter all air and vapor in its ascent must pass previous to condensation; substantially as shown and described.

This specification signed and witnessed this 22d day of June, 1901.

ANDREW J. CHASE.

Witnesses:
F. M. HOOPER,
CHARLES CARR.